United States Patent
Hughes et al.

(10) Patent No.: US 7,558,705 B1
(45) Date of Patent: Jul. 7, 2009

(54) CONNECTIVITY CONTROLLED WIRE ROUTING

(75) Inventors: Andrew Charles Hughes, Huntingdon (GB); Gordon Norrie, Sawston (GB)

(73) Assignee: Dassault Systemes SolidWorks Corporation, Concord, MA (US)

( * ) Notice: Subject to any disclaimer, the term of this patent is extended or adjusted under 35 U.S.C. 154(b) by 504 days.

(21) Appl. No.: 11/387,653

(22) Filed: Mar. 23, 2006

(51) Int. Cl.
G06F 17/50 (2006.01)

(52) U.S. Cl. .............................. 703/1; 174/34; 174/43; 174/72 A (58) Field of Classification Search .................. 703/1, 703/6; 361/690; 174/34, 43, 72 A; 439/217
See application file for complete search history.

(56) References Cited

U.S. PATENT DOCUMENTS

| | | | | |
|---|---|---|---|---|
| 5,442,518 A | * | 8/1995 | Beam | 361/690 |
| 5,811,732 A | * | 9/1998 | Beam | 174/72 A |
| 6,089,892 A | * | 7/2000 | Snow et al. | 439/217 |
| 6,644,987 B2 | * | 11/2003 | Meleck | 439/107 |
| 7,243,883 B2 | * | 7/2007 | Judd et al. | 248/74.1 |

OTHER PUBLICATIONS

Drumheller, M. Constraint-based Design of Optimal Transport Elements, Proceedings of the 7th ACM Symposium on SolidModeling and Applications, Jun. 2002, pp. 401-412.*

* cited by examiner

*Primary Examiner*—Russell Frejd
(74) *Attorney, Agent, or Firm*—Hamilton, Brook, Smith & Reynolds, P.C.

(57) ABSTRACT

Generating a routing system for a three-dimensional model of a real-world object includes specifying a set of connections, applying a filter to the connections to prevent more than one connection having the same first connector and the same second connector from being rendered more than once, creating geometric entities that are curves and that represent the connections, and displaying the routing system in a visually simplified manner by rendering the plurality of geometric entities. Additionally, the connections can automatically be merged into a harness bundle.

20 Claims, 12 Drawing Sheets

CONNECTIVITY CONTROLLED WIRE ROUTING

BACKGROUND OF THE INVENTION

Computer-aided design (CAD) software allows a user to construct and manipulate complex three-dimensional (3D) models. A number of different modeling techniques can be used to create a 3D model. These techniques include solid modeling, wire-frame modeling, and surface modeling. Solid modeling techniques provide for topological 3D models, where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to the topological faces bounded by the edges. Wire-frame modeling techniques, on the other hand, can be used to represent a model as a collection of simple 3D lines, whereas surface modeling can be used to represent a model as a collection of exterior surfaces. CAD systems may combine these and other modeling techniques, such as parametric modeling techniques. Parametric modeling techniques can be used to define various parameters for different features and components of a model, and to define relationships between those features and components based on relationships between the various parameters.

A design engineer is a typical user of a 3D CAD system. The design engineer designs physical and aesthetic aspects of 3D models, and may be skilled in 3D modeling techniques. The design engineer creates parts and may assemble the parts into a subassembly. An assembly is designed using parts and subassemblies.

When modeling electromechanical parts, a design engineer may design a wiring system that is quite complex with thousands of required connections between hundreds of different connectors and items of equipment. To define the required connections in a wiring system, an electrical design engineer typically creates schematics or from-to connection lists. From-to connection lists contain data that specifies details about the connections. From-to connection lists can be generated by commercially available electrical CAD systems. Alternatively, connections may be entered manually into a spreadsheet format.

An electrical design engineer needs to understand what wiring connections to make, what connectors to use, where to locate the connectors, and what parts and subassemblies need to be connected. Wires are not just draped across various parts and subassemblies; wires are bundled together to create a wiring harness. The design engineer needs to find the optimum path through the equipment and decide where to run all of the wires without clashing with other objects. The bundles also may need to be regularly fastened to the equipment to prevent the bundles from moving and potentially fouling other equipment.

Conventionally, designing electrical connections includes building a physical mockup or prototype of a product. Then, using a schematics or a from-to list of connections, the wiring system is physically built into the mock-up. Connectors are fixed in the appropriate places and wires are physically inserted. The wires may be grouped together into bundles, which are held together by tape, ties, or coverings. The wiring system is then removed from the mock-up, placed on a large sheet of paper, and traced to create a harness drawing. The harness drawing is then used as a template to manufacture the wiring system.

Presently, commercially available 3D modeling tools can be used to create wiring systems without building a physical mock-up of a product. Such tools replace the cumbersome and time-consuming task of, and save the expense related to creating mock-ups.

Connections in an electrical system typically run between pins of multi-pin connectors. Thus, for each multi-pin connector there are numerous potential connections. Commercially available 3D modeling tools may display each individual pin-to-pin connection resulting in a rat's nest of lines representing every single connection. Harnessing the wires and routing the wire bundle through a harness covering helps to simplify the graphical image of an electromechanical 3D model.

Ratsnests have long been used for electronic layout for PCB design and for electrical design and are currently used for electrical harness design and modeling. Typically, a ratsnest is generated for every connection, is represented by straight lines, and is used as a visual guide only. Disadvantages of generating ratsnests include the load placed on computer resources to process and draw every connection, the lack of visual clarity that can result from displaying a complex wiring system, and the absence of a automated mechanism to aid in the creation of the physical manifestation of the required routes from the ratsnests.

Replacing the need to create a physical mock-up by providing a means to create a virtual mock-up, and doing so without excessively burdening available computing resources and while helping design engineers easily transition to work efficiently within a 3D CAD environment would be advantageous to electrical design engineers who may be unfamiliar with 3D CAD systems. Moreover, a mechanism that simplifies the task of designing a wiring system design and that clearly represents the wiring system would enhance productivity.

SUMMARY OF THE INVENTION

Systems and methods for generating a routing system for a three-dimensional model of a real-world object are disclosed herein. In some embodiments, the systems and methods include specifying a number of connections that have two connectors and that are distinguished by supplemental data, applying a filter to the connections to prevent more than one of the connections having the same connectors from being rendered more than once, creating geometric entities that are curves and that represent the connections subsequent to the application of the filter such that only one geometric entity is created for any group of the connections having the same connectors, and displaying the routing system in a visually simplified manner by rendering the geometric entities.

Embodiments may include applying another filter to the connections for further visual simplification of the routing system. Moreover, the other filter can use the supplemental data and can reduce the number of geometric entities created based on the connection length, wire type, cable type, signal name, signal type, connector type, total number of connections, and routing system zone.

Additionally, implementation can include importing a file that specifies connections by defining a from-connector and a to-connector for each connection, and automatically bundling the connections by merging a selected group of connections into a three-dimensional harness object. To automatically bundle the connections, the from-connector and the to-connector for each connection in the selected group of connections is sorted into different connector groups, a junction point near one of the two connector groups is created, and each one of the selected group of connections is routed from a connector in one connector group through the junction point to a connector in another connector group. An embodiment can create the junction point by finding a geometric center of connectors of the connector group nearer the junction point determining a distance from the geometric center of connectors based on a bend radius of the selected group of connections, determining a direction based on direction vectors of one connector group and direction vectors of another connector group, and positioning the junction point at a location defined by offsetting the geometric center of connectors in the direction by the distance based on the bend radius.

The details of one or more embodiments of the invention are set forth in the accompanying drawings and the description that follows. Other features, objects, and advantages of the invention will be apparent from the description and drawings, and from the claims.

DETAILED DESCRIPTION OF THE INVENTION

The present invention provides advanced modeling capabilities for the design of routing systems. Such modeling capabilities include the visualization and creation of necessary routes. The present invention facilitates the design of complex routing systems by electrical design engineers who may be inexperienced in 3D CAD modeling, reduces the number of errors in a routing system by deriving all data from a from-to list of connections, and aids in the discovery of the most efficient routing thereby reducing costs and design time, and minimizing the amount of re-work necessary and the amount of wire stress.

The present invention assists in creating a virtual mockup and enables engineers to easily and quickly visualize wiring and cabling systems. Using the present invention, a design engineer can create harness bundles and route elements of the harness through a 3D model. Moreover, the present invention can automatically convert individual wires or cables into a route, join an individual wire or cable into an existing route, and merge two or more individual wires or cables into a route while automatically creating a junction or a branch. (In general, the notion of wiring and cabling, as well as the words wire and cable are used interchangeably herein.)

Figure 1:
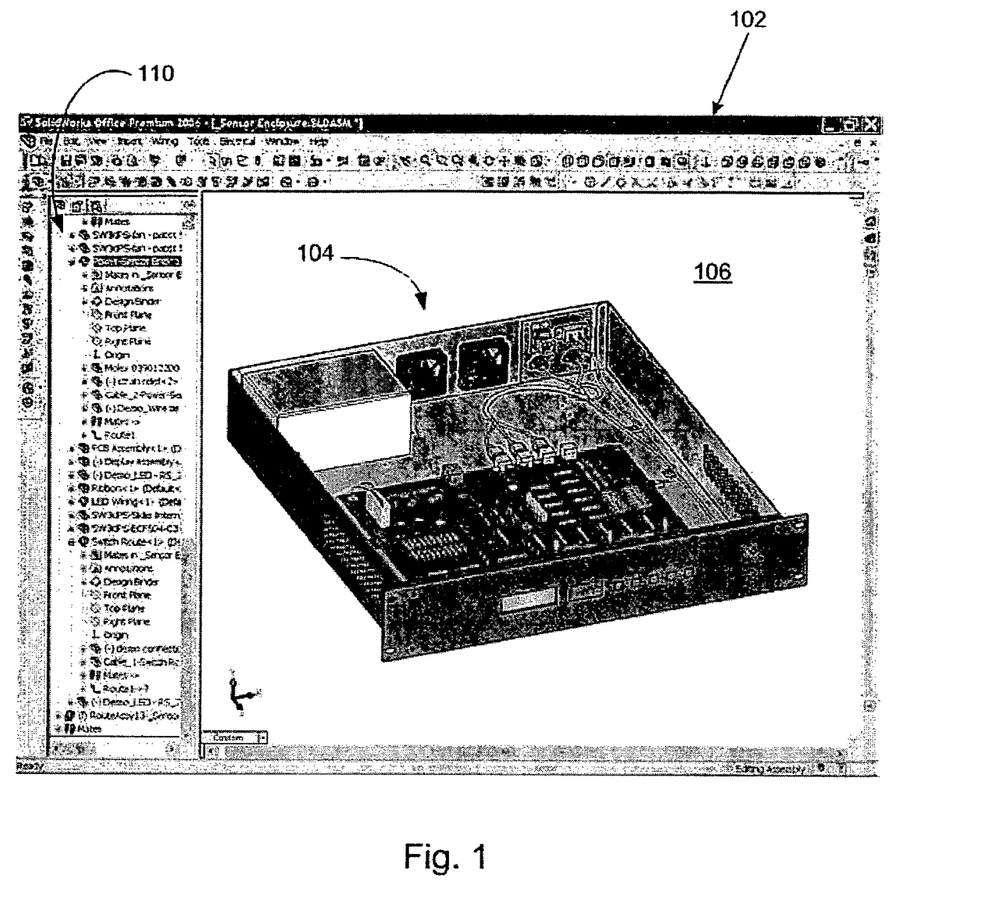
FIG. 1 is an illustration of a computer-generated model displayed in a window.

Referring now to FIG. 1, a window 102 displayed on a computer monitor is shown. The window 102 is generated by modeling software executed by a computerized modeling system, an example of which is later shown with reference to FIG. 8. The window 102 is a conventional computer-generated window that can be programmed by one of ordinary skill in the art using conventional, commercially available, software programming tools, such as those available from Microsoft Corporation of Redmond, Wash.

A computer-generated 3D model 104 is displayed within a modeling portion 106 of the window 102. The surfaces of the 3D model 104 can be displayed, or the 3D model 104 can be displayed using solid lines and dashed lines to show visible edges and hidden edges, respectively, of the 3D model. Moreover, surfaces can be transparent to reveal model components beneath such surfaces. Implementations also may include other window areas, such as a FeatureManager® window panel 110 in which the structure of a component, an assembly, or a drawing is listed to help the design engineer visualize and manipulate the 3D model 104, as well as components of the 3D model 104.

Figure 2:
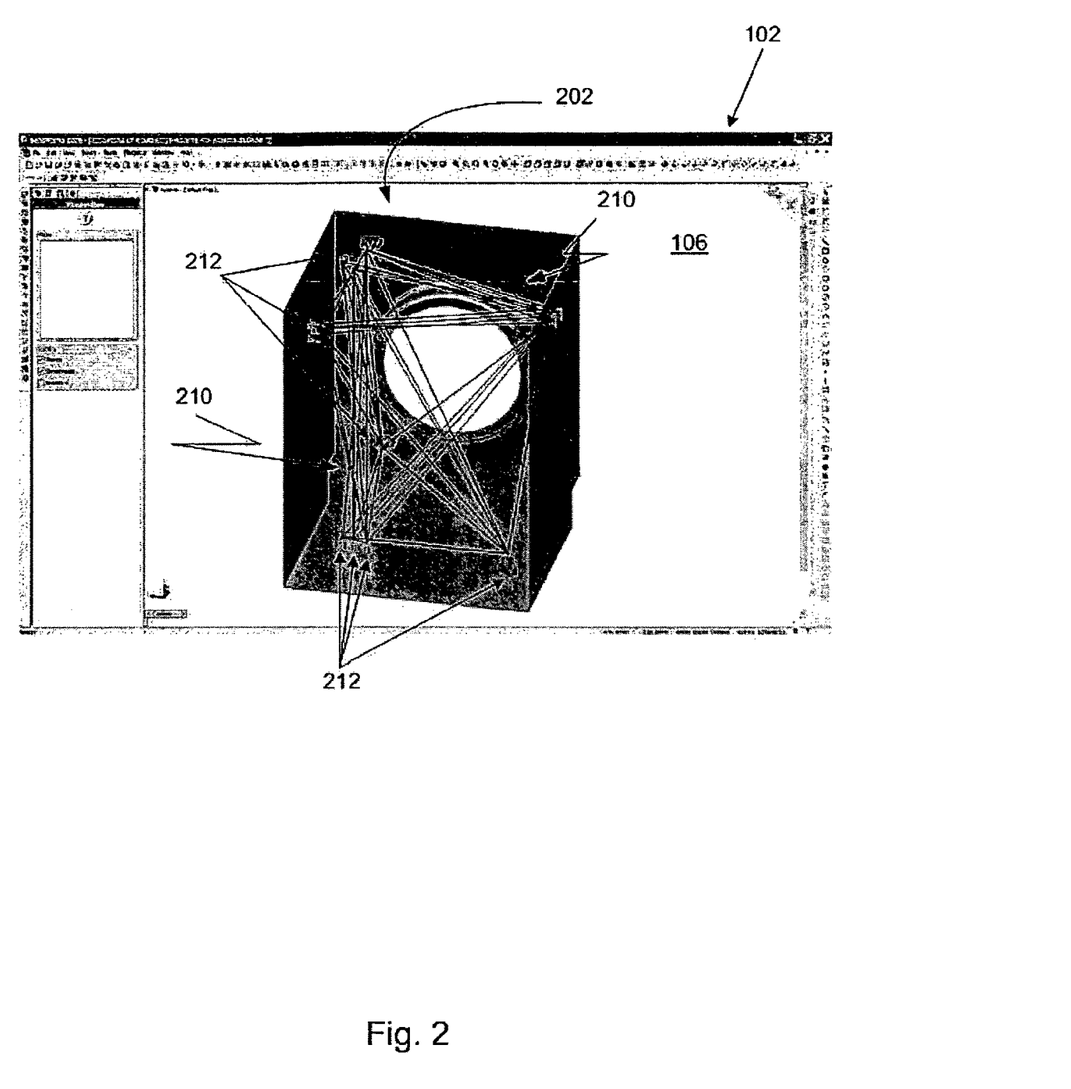
FIG. 2 is an illustration of a computer-generated model displayed in a window.

Referring to FIG. 2, the window 102 contains a 3D model 202, which is a frame with a ratsnest of wires 210 (i.e., straight lines between connections that graphically represent the electrical connections). The frame also contains connectors 212. Often, many of the connections from any given connector are connected to pins on another given connector. The present invention rationalizes this connectivity and will show a single connection from a first connector to a second connector rather than showing the many actual connections between the two connectors, to reduce the complexity of a ratsnest of wires. To rationalize the connectivity, the present invention analyzes the connections listed in a spreadsheet or in a from-to list.

Figure 3:
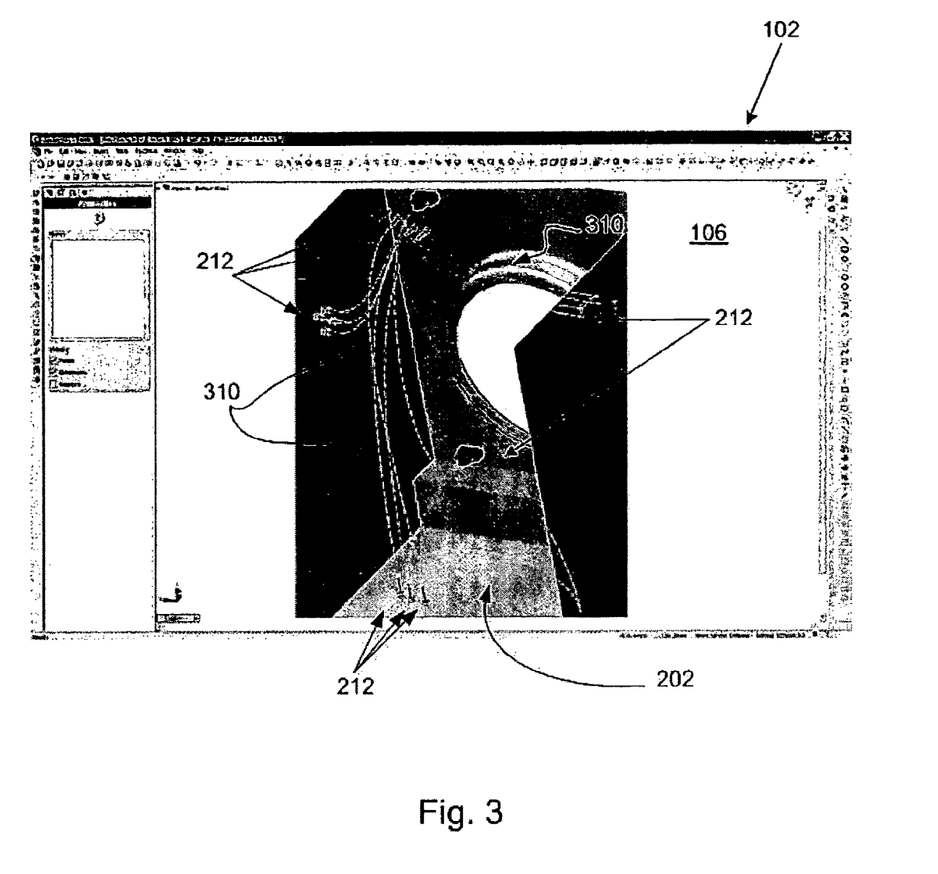
FIG. 3 is an illustration of a computer-generated model displayed in a window.

Referring now to FIG. 3, a more aesthetic image of model 202 is shown. The present invention takes each straight line drawn between connectors that created the ratsnest 210 shown in FIG. 2, applies a filter to reduce the number of lines, creates a spline that has endpoints at the center of the connectors for each of these lines, and displays the splines 310 instead of the straight lines. Displaying the connections as splines 310 rather than straight lines affords a clearer impression of where routes need to run.

Figure 4:
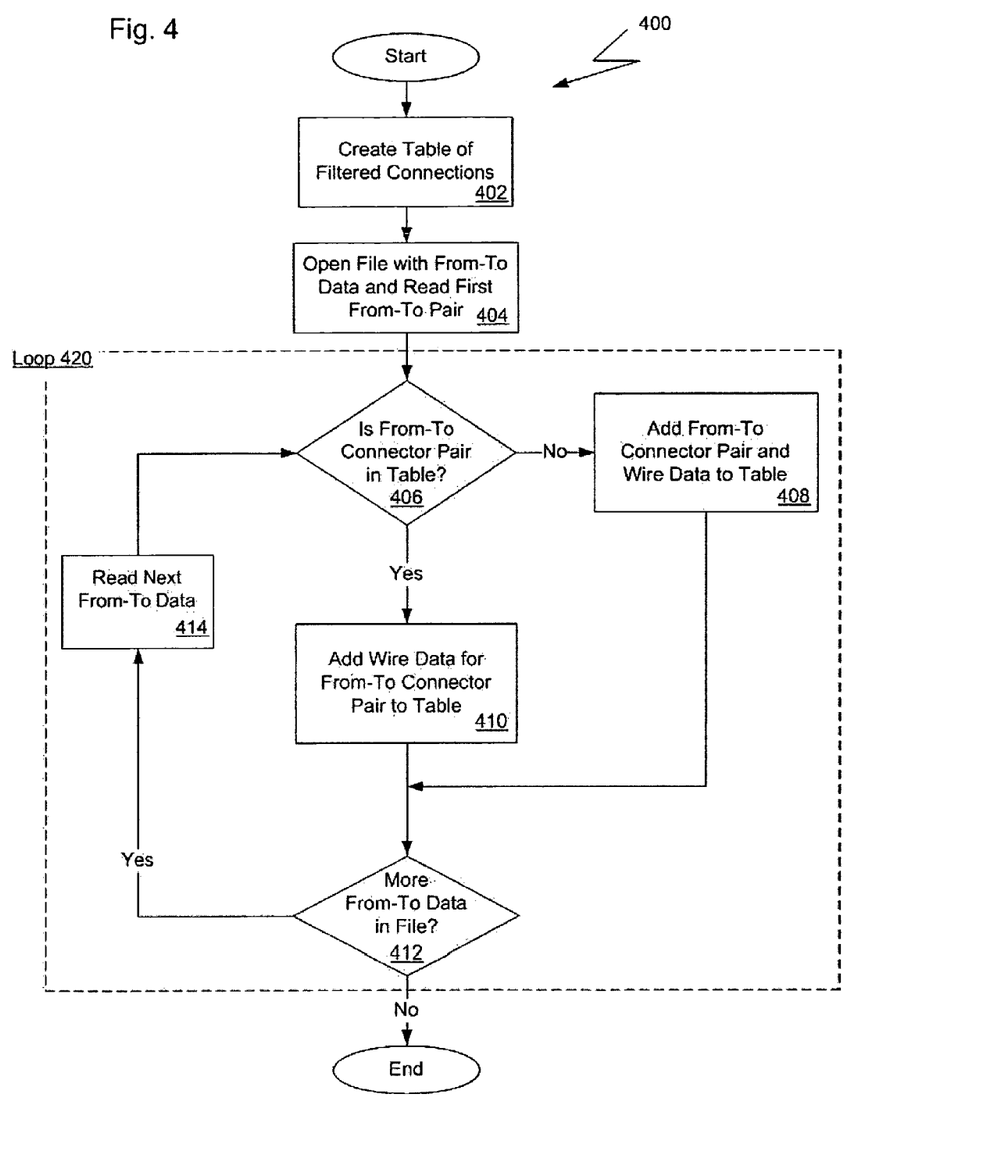
FIG. 4 is a flowchart of a procedure that filters connections.

FIG. 4 is a flowchart showing a procedure 400 that filters from-to connections so that only one connection is displayed between any set of two connectors. Displaying connector-to-connector guidelines rather than pin-to-pin guidelines significantly reduces clutter in an image of an electrical system. Procedure 400 identifies connections having the same "from" and "to" connectors so the connections may be drawn only once. To begin, procedure 400 creates a table that will specify the filtered connections (step 402). The file containing the data specifying the from-to connections is then opened and the first from-to pair of data is read (step 404). For the first and subsequent iterations of loop 420, procedure 400 determines if the from-to connector pair is in the table (step 406), and if not, data identifying the from-to connector pair and wire data is inserted into the table (step 408). The wire data for the connector pair specifies details about the wire, such as the wire type, the signal type, and the signal name. If the from-to connector pair is in the table, just the wire data is inserted into the table and associated with the from-to connector pair already existing in the table for the pair currently being processed (step 410). The procedure 400 continues by checking whether the file contains more from-to data to read from the file (step 412) and reads the next pair of from-to data if the entire file has not been read (step 414); otherwise, the procedure 400 ends.

Guideline filters (such as that described with reference to FIG. 4), reduce the complexity of a ratsnest to allow the design engineer to easily understand routing requirements. Using guideline filters, the design engineer can break down a complex 3D design problem into a number of lesser tasks that greatly simplify the routing design process, which may result in the creation of a better harness solution in less time than using unfiltered guidelines. In addition to a guideline filter that prevents more than one guideline from being displayed between the same connectors, the present invention provides additional guideline filters.

Figure 5A:
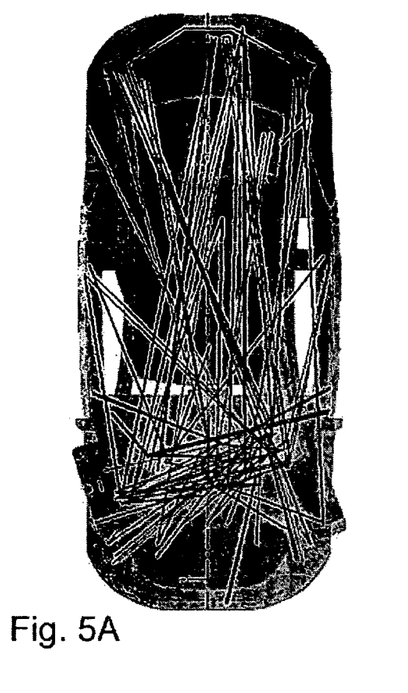
FIG. 5A is an illustration of an electrical system for an automobile.
Figure 5B:
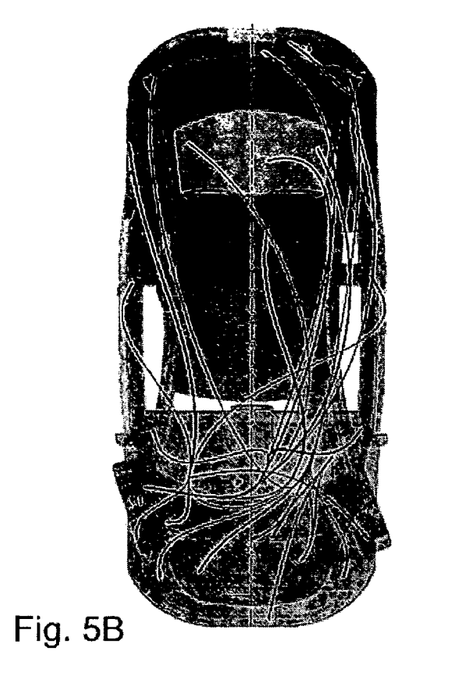
FIG. 5B is an illustration of an electrical system for an automobile.
Figure 5C:
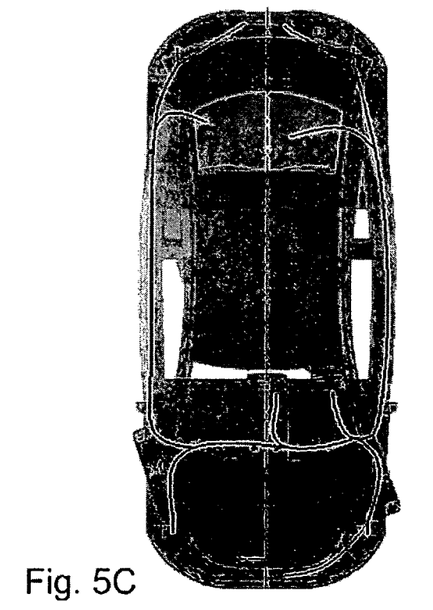
FIG. 5C is an illustration of an electrical system for an automobile.

One additional guideline filter embodied in the present invention analyzes the length of a route, and displays the shortest connections or the longest connections. Filtering out all connections except the shortest connections is useful to show a group of connectors in close proximity to one another. The task of creating route bundles for the shortest connections can then be accomplished quickly. Filtering out all connections except the longest connections is useful to visualize the main trunk routes through the model (i.e., the routes where many wires or cables will run). FIGS. 5A, 5B, and 5C show an electrical system as a ratsnest, the electrical system after a filter is applied to reduce the number of connections displayed, and harness bundles showing the wiring harness, respectively.

To filter guidelines based on length, the design engineer specifies a range of values that indicate length. A user interface can allow the design engineer to enter numbers specifying the range, or the design engineer may pick a guideline displayed in the window, and the length of that guideline can be used to specify the range of values. For example, guidelines that are a certain percentage longer and shorter than the selected guideline may be the only guidelines displayed after the filter is applied.

Other additional guideline filters embodied in the present invention include filters that only allow the display of guidelines having a certain signal name, signal type, wire name or type, cable name or type, or connector type. Generally, any information in a from-to list or a connection spreadsheet can be used by a guideline filter. When the present invention reads the from-to list or the connection spreadsheet, the present invention reads the data in the field that is pertinent to the specified filter (e.g., type of connector, type of signal, or name of signal) and only allows the from-to connection that matches the filter criteria to be displayed. One implementation may create a separate data structure that identifies from-to connections that have been filtered for display, such as the table described with reference to FIG. 4. Whereas, another implementation may set a flag to indicate that a from-to connection associated with the flag has been filtered for display.

Another additional guideline filter embodied in the present invention prevents guidelines outside certain zones from being displayed. By way of non-limiting example, a zone may encompass only specific pieces of equipment (e.g., fans, power supplies, control panels), or specific locations. Equipment zones may be indicated by commonly known selection techniques, such as selecting the name of the equipment in a user interface list presented to the design engineer, or pointing and clicking on one or more pieces of equipment (or a subassembly) displayed in a window.

Yet another guideline filter embodied in the present invention prevents guidelines beyond a certain number from being displayed. A filter that only allows the display of no more than a specified number of guidelines may not display those guidelines read from a file subsequent to reading the specified number of guidelines. However, an embodiment may apply another criteria to the determination of which guidelines to display. By way of non-limiting example, after detecting that the number of guidelines will exceed a specific number, only those guidelines having a length within a certain range may be displayed or only those guidelines within a certain zone may be displayed. An embodiment may display a dialog box to enable the design engineer to specify other filters to apply to the from-to list and rank the filters in the order to be applied.

In many cases, after connections are created for an electrical system, the design engineer creates a 3D harness bundle by grouping the wires, and for physical mock-ups, the design engineer tapes, ties, or clips the grouped wires to a piece of equipment. The present invention aids the design engineer with this task via a merging process that automatically converts a ratsnest of connections or filtered guidelines into a 3D harness bundle that can be manufactured. The merging process creates a bundle from a group of wires, cables, or both. The bundle that is created is a fully featured 3D component that encloses connections and provides a path between three or more connectors.

Figure 6A:
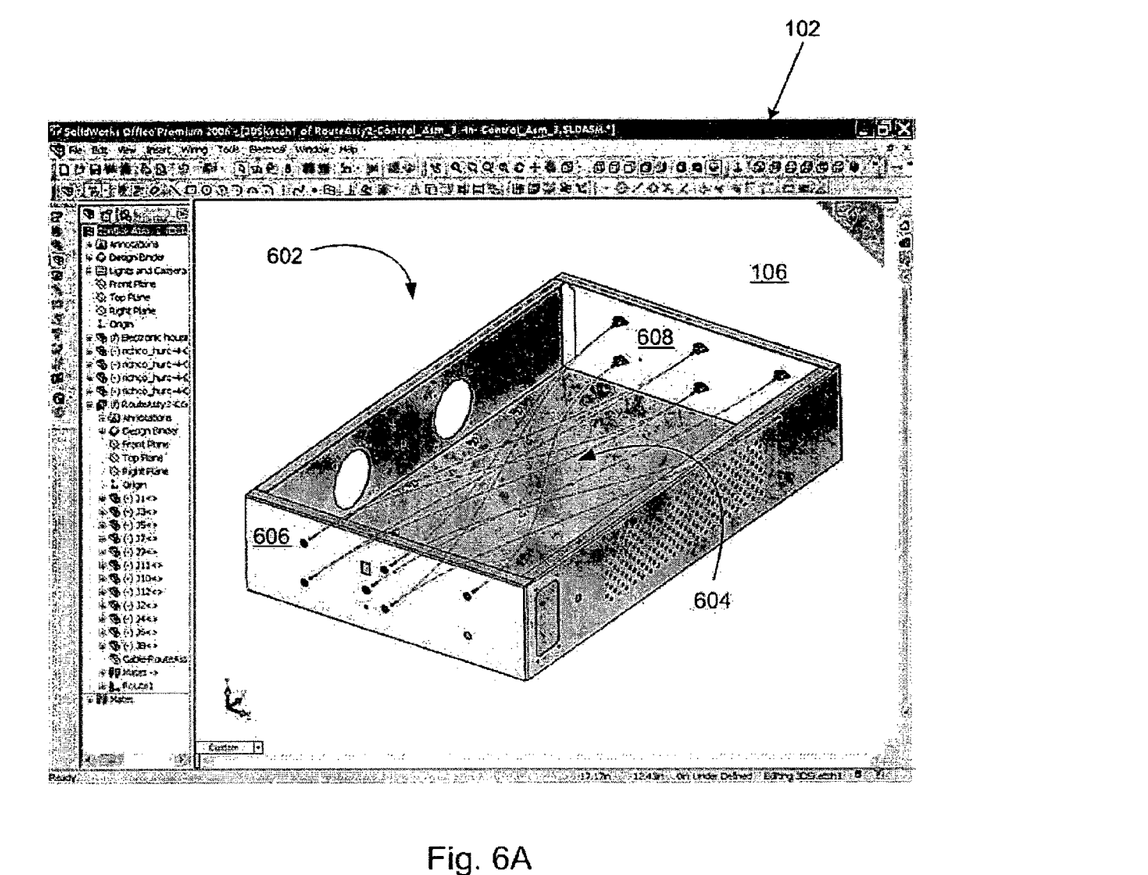
FIG. 6A is an illustration of computer-generated model of an electrical system in a metal frame.

Referring now to FIG. 6A, the window 102 contains a 3D model 602 of a metal frame in which there is an electrical system. The electrical system is shown as several filtered guidelines 604 having paths, where each path runs between two connectors. The electrical system has a total of twelve connectors, six of which are mounted on a wall 606 of the metal frame and six mounted on an opposite wall 608.

Figure 6B:
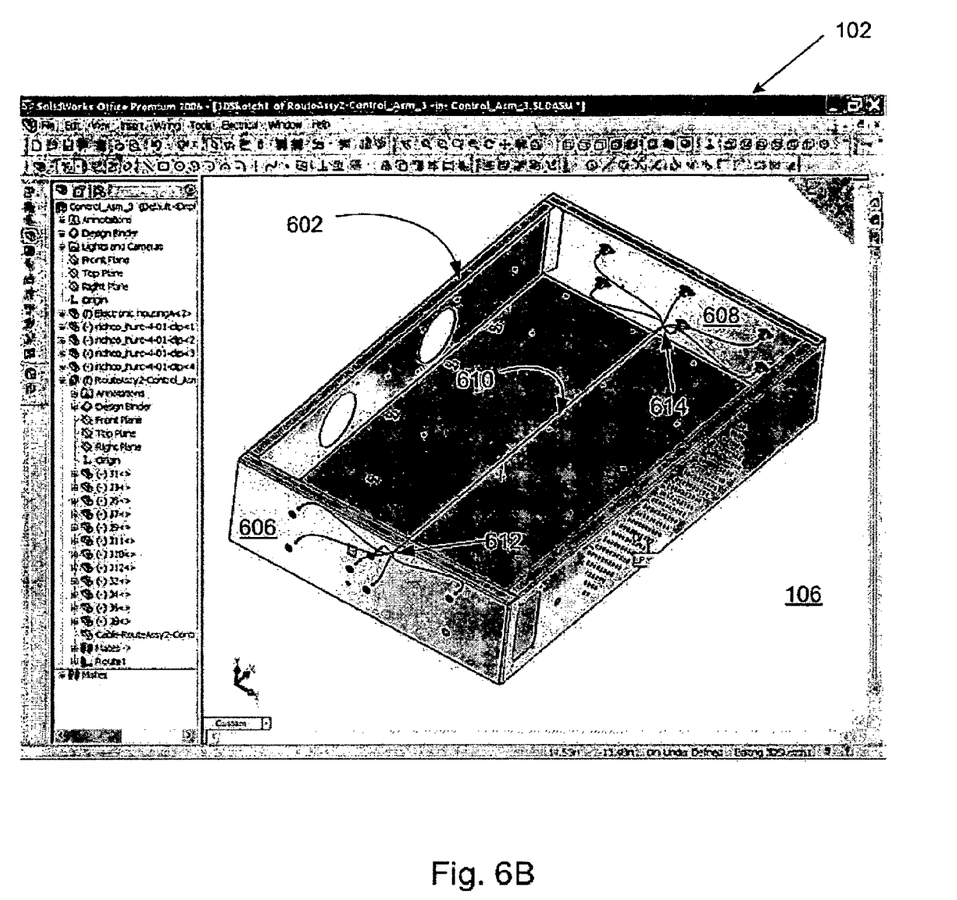
FIG. 6B is an illustration of computer-generated model of an electrical system in a metal frame.

FIG. 6B shows 3D model 602 with the guidelines merged within a bundle 610. The bundle 610 has two joints 612 and 614, where the ends of the wires attached to connectors on one wall 606 join together and the ends of the wires attached to connectors on the opposite wall 608 join together, respectively. The location of joints 612 and 614 depend on the location of the connectors to which the guidelines attach, the number of wires and the thickness of the wires represented by a guideline, and the amount that the wires merging together can bend.

Figure 6C:
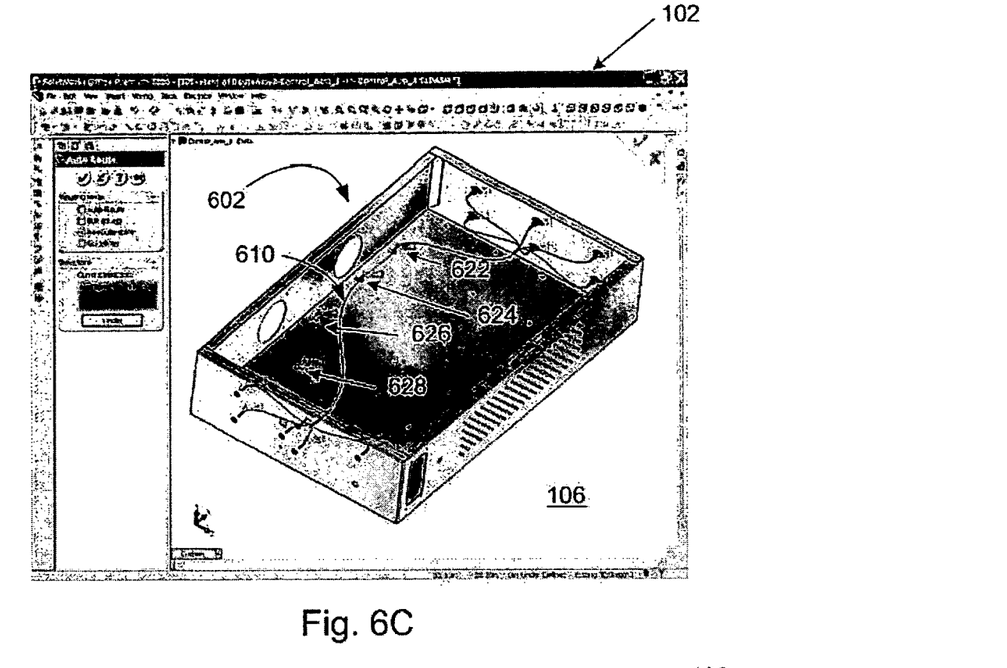
FIG. 6C is an illustration of computer-generated model of an electrical system in a metal frame.
Figure 6D:
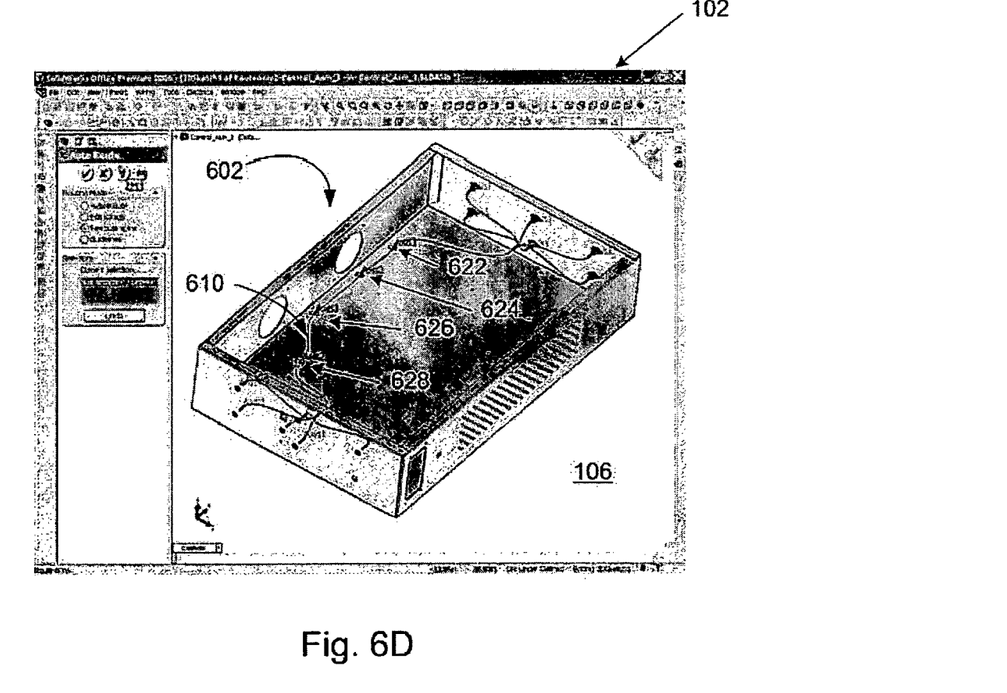
FIG. 6D is an illustration of computer-generated model of an electrical system in a metal frame.

FIG. 6C and FIG. 6D show the 3D model 602 with the bundle 610 clipped to the metal frame. In FIG. 6C, the bundle 610 is clipped using a first clip 622 and a second clip 624. In FIG. 6D, the bundle 610 is also clipped using a third clip 626 and a fourth clip 628. The length of the bundle 610 is increased if need be when additional clips require the bundle to have a longer path.

Figure 7:
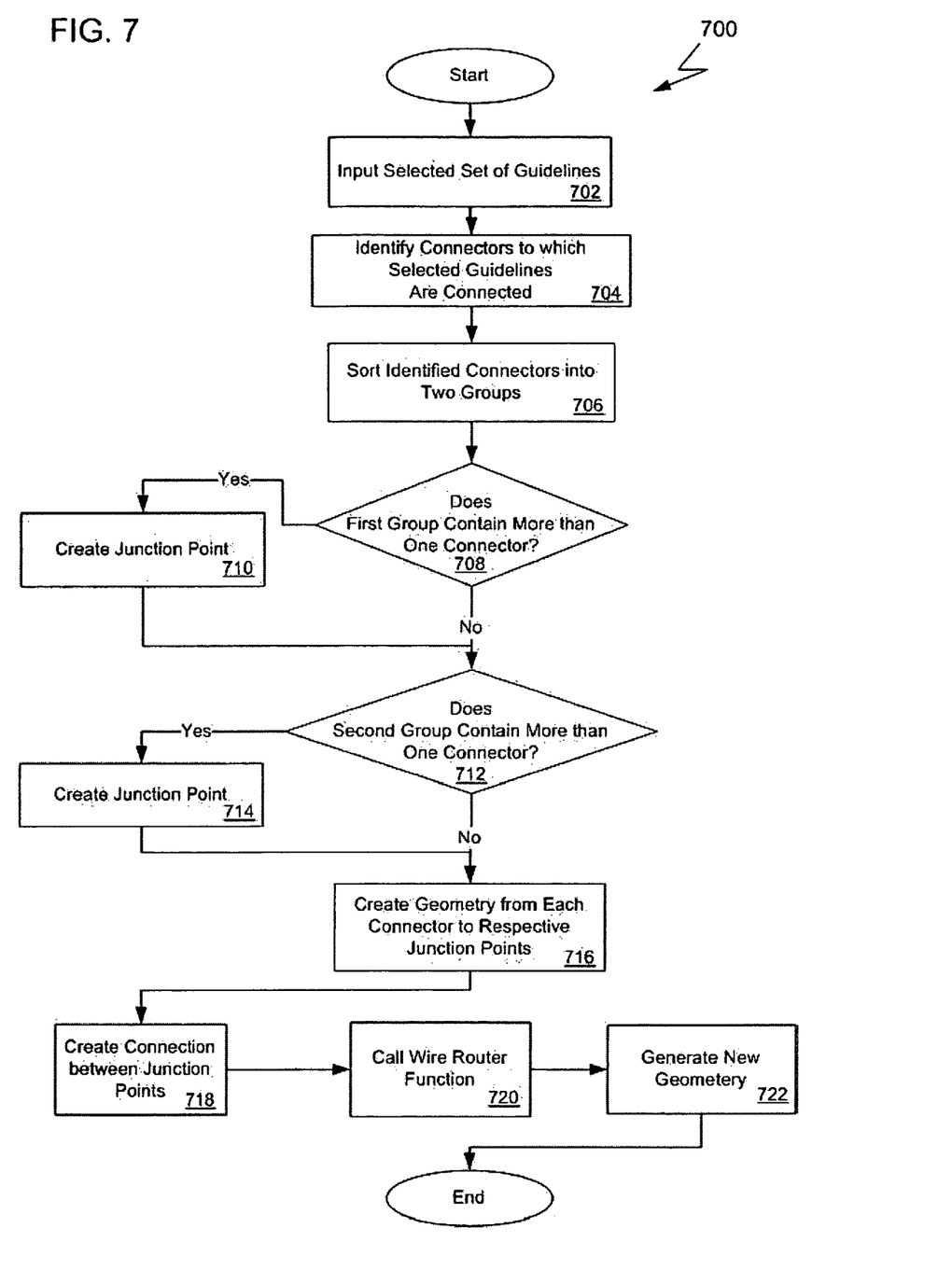
FIG. 7 is a flowchart of a procedure that merges guidelines.

FIG. 7 is an illustration of a procedure 700 that automatically merges the guidelines 604 shown in FIG. 6A into the bundle 610 shown in FIG. 6B. Input to procedure 700 is a set of selected guidelines (step 702), which may be selected using various selection techniques known by those of ordinary skill in the art. The guidelines that are input are supported by data defining the unfiltered wires from which the guidelines have been generated. By way of non-limiting example, the data includes the total number of wires being merged, and the bend radius and thickness of each wire being merged.

In the next step, the procedure 700 identifies the connectors to which the selected guidelines are connected (step 704). The identified connectors are then sorted by proximity into two groups (step 706). One group of sorted connectors will be situated at one end of the bundle and the other group of sorted connectors will be situated at the other end of the bundle. The two connectors to which a selected guideline connects are not placed in the same group. Often, the groups will contain a different number of connectors, and possibly, one group may contain only one connector. A technique for sorting the connectors will later be discussed.

Next, procedure 700 checks if the first group contains more than one connector (step 708), and if so, creates a junction point for the first connector group (step 710). In the next step, procedure 700 determines whether the second group of connectors contains more than one connector (step 712), and if so, creates a junction point for the second group (step 714). If a group has only one connector, a junction point is not created; rather, the connector stub (i.e., the route taken by wires entering or exiting a connector) becomes the junction point.

The procedure then creates geometry from each connector to the respective junction point (step 716). The geometry is in the form of a simple spline with a tangent constraint at each end so that the spline is tangent to the connector stub at one end and at the other end is tangent to a vector designating a direction at the junction point.

The connection is then created between the two junction points (step 718). This connection is also a simple spline with tangency constraints to the vectors that designate a direction at the junction points or to a connector stub when a group has only a single connector.

In the next step, a wire routing function is called (step 720). The wire routing function reads the from-to list to attempt to route wires by finding a path that a particular wire can take through the bundle. Wire routing functions such as that used by the present invention may be written by one of ordinary skill in the art. Wire routing functions are also commercially available. After the wires are routed, the diameter of the bundle is calculated to reflect the density of the wires contained therein, the lengths of the wires threaded through the bundle are calculated and can be used in a bill of materials, and new geometry is generated for the wires between the connectors and junction points and for the bundle and (step 722). Any temporary lines or splines that represented the newly routed wires will automatically be removed.

To create the junction point in step 710, the procedure finds the geometric center of the connectors in the respective connector groups. The geometric center of the first connector group is then offset towards the geometric center of the second connector group in a direction determined by summing the average of the direction vectors extending from the connector stubs in the first connector group and the average of the direction vectors extending from the connector stubs in the second connector group. The distance of the offset depends on the bend radius of the guidelines being merged. In an extreme case, a wire will have to bend twice by 90° to be routed from a connector to a junction point. Therefore, the distance of the offset needs to be twice the minimum bend radius of all wires represented by any one guideline being merged. (Determining the minimum bend radius will later be discussed.) The junction point for the first connector group is then created at the offset location. The junction point for the second connector group is determined in a like manner. Other embodiments may use other factors t determine the location of the junction point. By way of non-limiting example, other factors that may determine the junction point location include the thickness of a bundle, the proximity of all connectors to one another within one group of connectors, and the direction toward the other connector group.

Additionally, a directional vector is created at each junction point to designate the direction of the bundle, and as mentioned with reference to steps 716 and 718, are utilized to create the bundle geometry. Each directional vector is the average of all the vectors of each connector stub in the respective connector group. The bundle diameters may be taken into account when calculating the direction. For example, a thicker bundle of wires emanating from one connector is bent less than a smaller bundle of wires. By using the bundle diameters as a multiplier to the vector calculations, the vector is automatically adjusted to reduce bending for thicker bundles.

The larger a bundle of wires is, the harder the bundle is to bend. As the bundle is bent the wires inside the bundle are stressed, and those near the inside of the bend are compacted while those on the outside of the bend are stretched. The minimum bend radius of a bundle of wires may be determined by the diameter of the bundle, the minimum bend radius of all the wires and cables inside the bundle, or both.

The diameter of the bundle is calculated first by determining the diameter of all the wires passing through the bundle. When wires are routed into a harness, a record is kept of which wires pass through each bundle. The outer diameter of each wire and cable may also be known from data in the from-to list. Alternatively, when the diameter data is not included in the from-to list (e.g., as may be the case with a 2D schematic) a wire library that supplements a from-to list may be provided and a lookup operation for a wire name may return the wire diameter.

The cross-sectional area of each wire in the bundle is computed and then these areas are summed together resulting in a total cross-sectional area of all wires in the bundle. The total cross-sectional area may be increased by a percentage to account for gaps within the bundle, as will be discussed. Then, a diameter for the resulting cross-sectional area that accounts for the gaps is computed.

Gaps remain between the wires and cables nested together inside a bundle and these gaps may be considered in determining the diameter of a bundle. Empirical methods have shown that a bundle diameter should be increased by 20% to 50% to account for the gaps, and the percentage varies depending upon the number of wires and cables in the bundle, and the range of diameters of those wires and cables. When only a few wires occupy a bundle, the wires do not nest closely together, so the diameter of a bundle should be increased by a larger percentage than when more wires occupy a bundle and tend to nest more efficiently.

In an embodiment of the present invention, gaps are not considered in the determination of the diameter of a bundle when the bundle contains one or two wires. If the bundle contains a single wire, the diameter of the single wire is used. If the bundle contains two wires, the diameter of the bundle is the sum of the diameters of the two wires. However, when the bundle contains three or more wires, gaps are considered in the determination.

Once the diameter of the bundle is computed, the minimum bend radius for the bundle may be determined by tripling the diameter of the bundle. The diameter may be tripled because, in general, a bundle should not be bent through a bend radius less than three times the bundle diameter. However, an embodiment permits the design engineer to multiply the bundle diameter by a factor other than three.

Rather than or in addition to determining the minimum bend radius of the bundle from the diameter of the bundled wires, the minimum bend radii of the wires in a bundle as specified in the from-to list or supplemental wire library may be used. An embodiment of the present invention finds the minimum bend radius of each of the wires in the bundle and ensures that the bundle does not bend by more than the minimum bend radius of any one of the wires.

Alternatively, an embodiment can set the minimum bend radius to the larger of three times the diameter of the bundle or the minimum bend radius determined by data stored in the from-to file or supplemental wire library.

Figure 8:
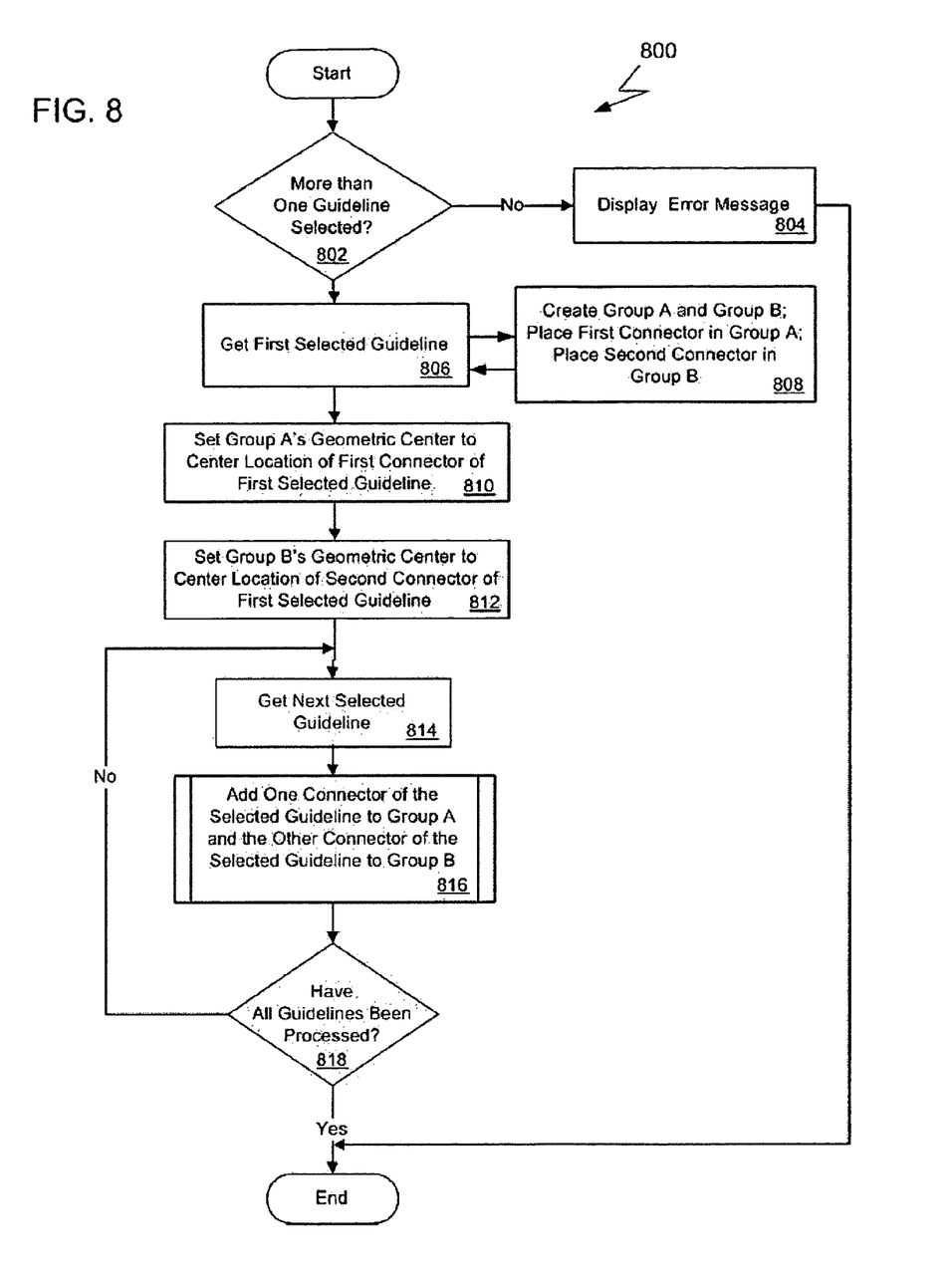
FIG. 8 is a flowchart of a procedure that groups connectors.

Referring now to FIG. 8, a procedure 800 that may be used to sort the identified connectors (in step 706 of FIG. 7) is shown. Procedure 800 analyzes the proximity of all the connectors and creates two groups depending on the proximity of the connectors to one another while ensuring that no two connectors to which the same guideline attaches are placed in the same group.

In the first step, procedure 800 tests whether more than one guideline is selected (step 802), and if not, displays an error message (step 804) and exits. If more than one guideline is selected, the first selected guideline is accessed (step 806), and two connector groups are created with one of the selected guideline's connectors placed in group A and the other one of the selected guideline's connectors placed in group B. In the next step, the geometric center of group A is set to the center location of the first connector of the selected guideline (step 810). Then, the geometric center of group B is set to the center location of the second connector of the selected guideline (step 812).

In the following step, the next selected guideline is accessed (step 814), and so long as an error condition does not arise, one connector of the selected guideline is added to group A and the other connector is added to group B (step 816), until all selected guidelines are processed (tested in step 818). The group to which the connectors are added depends on the proximity of the connectors to each group.

Figure 9:
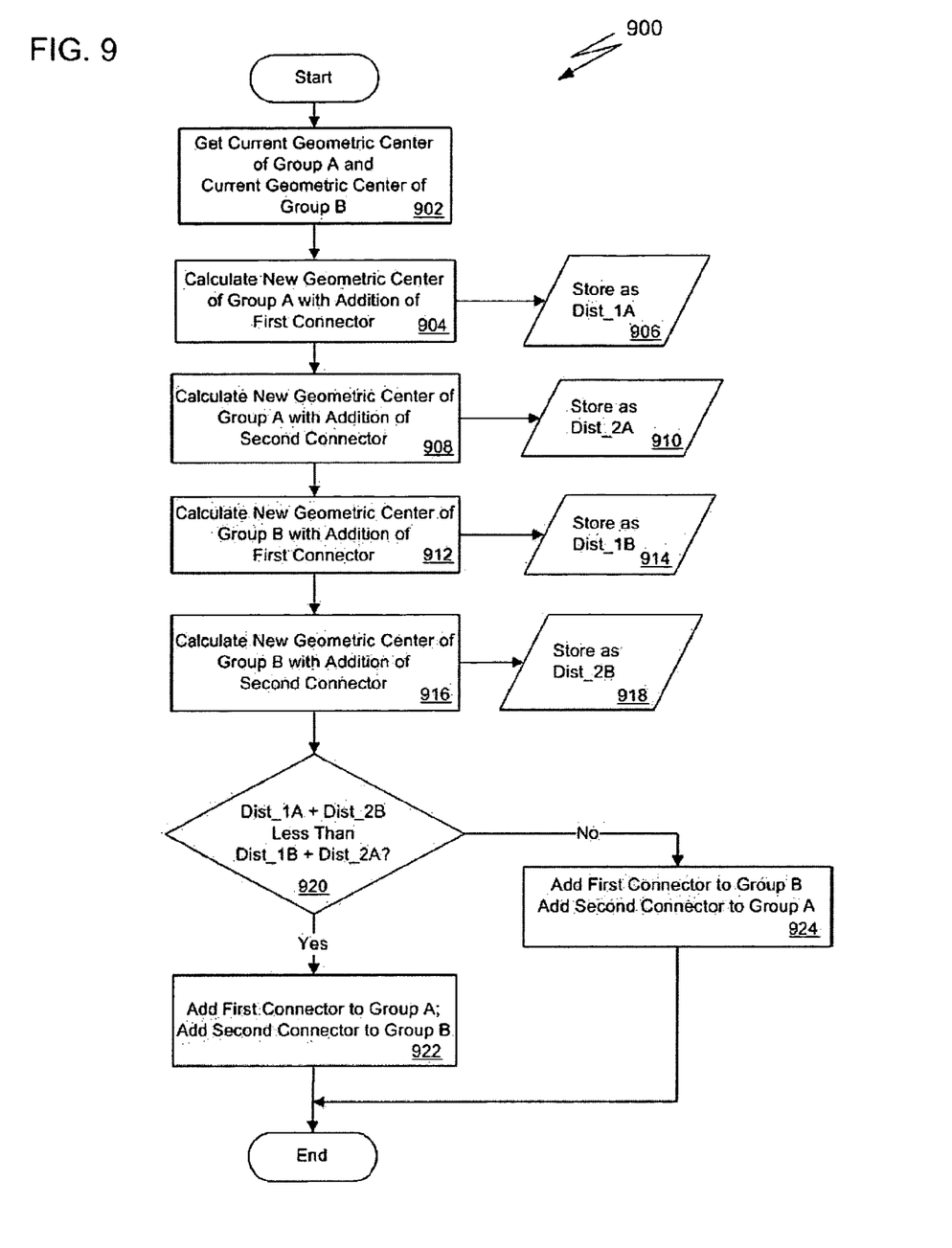
FIG. 9 is a flowchart of a procedure that groups connectors.

FIG. 9 is a flowchart of procedure 900, which shows step 816 of FIG. 8 in more detail. In the first step, the current geometric center of the connectors in group A and the current geometric center of group B are retrieved (step 902). A new geometric center is then computed for group A, first with the addition of the first connector (step 904) then with the addition of the second connector (step 908). The new geometric centers for group A are stored in variables named Dist_1A (step 906) and Dist_2A (step 910), respectively. New geometric centers for group B are also computed after adding the first connector to group B (step 912) and adding the second connector to group B (step 916). The new geometric centers for group B are stored in variables named Dist_1B (step 914) and Dist_2B (step 918), respectively.

After the new geometric centers are determined, procedure 900 determines whether the geometric centers changed less with the addition of the first connector to group A and the second connector to group B, or the first connector to group B and the second connector to group a (step 920). If the geometric centers moved less with the addition of the first connector to group A and the second connector to group B, then the first connector is added to group A and the second connector is added to group B (step 922); otherwise, the first connector is added to group B and the second connector is added to group A (step 924). An embodiment may also check whether the standard deviation of the geometric centers changed by more than a given amount and, if so, generate an error message to prevent wires from merging that have very different paths.

Figure 10:
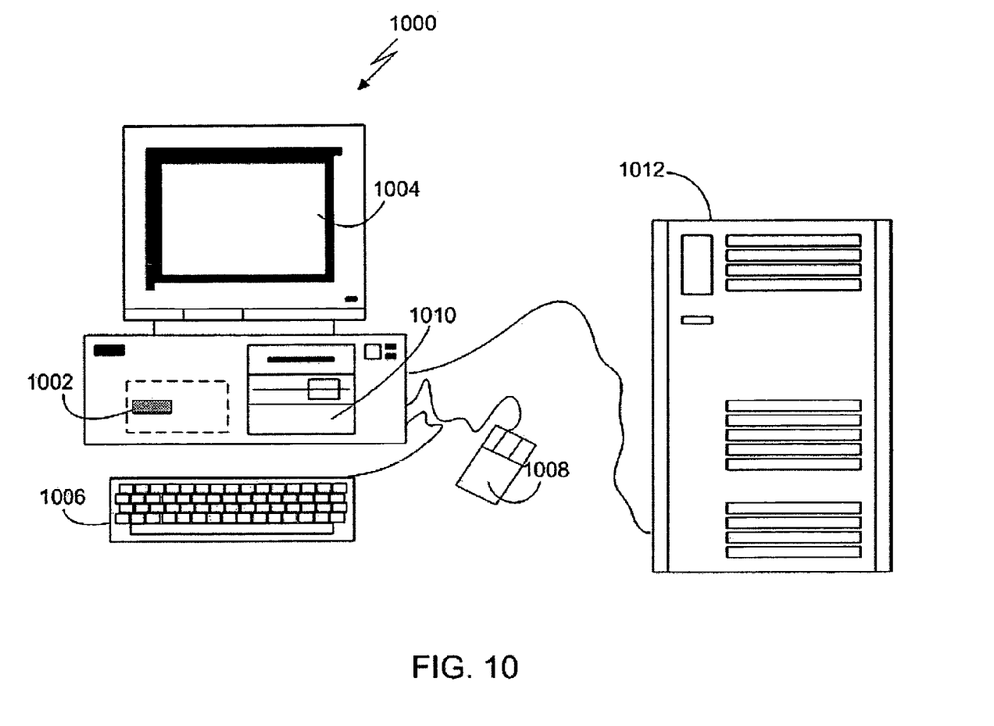
FIG. 10 is a diagram of a computer system.

Referring now to FIG. 10, a computerized modeling system 1000 is shown and includes a CPU 1002, a computer monitor 1004, a keyboard input device 1006, a mouse input device 1008, and a storage device 1010. The CPU 1002, computer monitor 1004, keyboard 1006, mouse 1008, and storage device 1010 can include commonly available computer hardware devices. For example, the CPU 1002 can include a Pentium-based processor. The mouse 1008 may have conventional left and right buttons that the user may press to issue a command to a software program being executed by the CPU 1002. As an alternative or in addition to the mouse 1008, the computerized modeling system 1000 can include a pointing device such as a trackball, touch-sensitive pad, or pointing device and buttons built into the keyboard 1006. Those of ordinary skill in the art appreciate that the same results described herein with reference to a mouse device can be achieved using another available pointing device. Other appropriate computer hardware platforms are suitable as will become apparent from the discussion that follows. Such computer hardware platforms are preferably capable of operating the Microsoft Windows NT, Windows 98, Windows 2000, Windows XP, Windows ME, UNIX, Linux, or MAC OS operating systems.

Additional computer processing units and hardware devices (e.g., rapid prototyping, video, and printer devices) may be included in the computerized modeling system 1000. Furthermore, the computerized modeling system 1000 may include network hardware and software thereby enabling communication to a hardware platform 1012, and facilitating communication between numerous computer systems that include a CPU and a storage system, among other computer components.

Computer-aided modeling software may be stored on the storage device 1010 and loaded into and executed by the CPU 1002. The modeling software allows a user to create and modify a 3D model and implements aspects of the invention described herein. The CPU 1002 uses the computer monitor 1004 to display a 3D model and other aspects thereof as described. Using the keyboard 1006 and the mouse 1008, the user can enter and modify data associated with the 3D model. The CPU 1002 accepts and processes input from the keyboard 1006 and mouse 1008. The CPU 1002 processes the input along with the data associated with the 3D model and makes corresponding and appropriate changes to that which is displayed on the computer monitor 1004 as commanded by the modeling software. In one embodiment, the modeling software is based on a solid modeling system that may be used to construct a 3D model consisting of one or more solid and surface bodies.

The invention may be implemented in digital electronic circuitry, or in computer hardware, firmware, software, or in combinations thereof. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

A number of embodiments of the present invention have been described. Nevertheless, it will be understood that various modifications may be made without departing from the spirit and scope of the invention. For example, implementations may change the order in which operations are performed. Furthermore, depending on the needs of an implementation, particular operations described herein may be implemented as a combined operation, eliminated, added to, or otherwise rearranged. By way of non-limiting example, prior to step 406 in Loop 420 of FIG. 4, a signal name or type may be checked and only if the signal name or type matches a given signal name or type will the procedure proceed to step 406; otherwise the procedure will proceed to step 414.

Accordingly, other embodiments are within the scope of the following claims.

What is claimed is:

1. A computer-implemented method for generating a routing system for a three-dimensional model of a real-world object, the method comprising:
   specifying a plurality of connections, wherein each connection has a first connector and a second connector, and each connection is distinguished by supplemental data;
   applying a first filter to the plurality of connections to prevent more than one of the plurality of connections having a same first connector and a same second connector from being rendered more than once by a computer-aided design system;
   creating a plurality of geometric entities, wherein:
      each one of the plurality of geometric entities is a curve; and
      the plurality of geometric entities represents the plurality of connections subsequent to the application of the filter such that only one geometric entity is created for any group of the plurality of connections having the same first connector and the same second connector; and
   displaying the routing system in a visually simplified manner by rendering the plurality of geometric entities.

2. The computer-implemented method of claim 1, further comprising applying a second filter to the plurality of connections for further visual simplification of the routing system, wherein the second filter utilizes the supplemental data.

3. The computer-implemented method of claim 2, wherein the second filter reduces the number of geometric entities created based on one of a length of connection, a wire type, a cable type, a signal name, a signal type, a connector type, a total number of connections, and a zone of the routing system.

4. The computer-implemented method of claim 1, wherein specifying the plurality of connections comprises importing a file that defines a from-connector and a to-connector for each one of the plurality of connections.

5. The computer-implemented method of claim 1, further comprising automatically bundling the plurality of connections by merging a selected group of connections into a three-dimensional harness object.

6. The computer-implemented method of claim 5, wherein automatically bundling the plurality of connections further comprises:
   for each connection in the selected group of connections, sorting a from-connector and a to-connector into different ones of two connector groups;
   creating a junction point near one of the two connector groups; and
   routing each one of the selected group of connections from a connector in a first one of the two connector groups through the junction point to a connector in a second one of the two connector groups.

7. The computer-implemented method of claim 6, wherein creating the junction point comprises:
   finding a geometric center of connectors of the one of the two connector groups nearer the junction point;
   determining a distance from the geometric center of connectors based on a bend radius of the selected group of connections;
   determining a direction based on a plurality of direction vectors of the first one of the two connector groups and a plurality of direction vectors of the second one of the two connector groups; and
   positioning the junction point at a location defined by offsetting the geometric center of connectors in the direction by the distance based on the bend radius.

8. The computer-implemented method of claim 6, wherein sorting the from-connector and to-connector into different ones of two connector groups comprises determining a closeness in proximity to the different ones of two connector groups.

9. A computer program product for computer aided design, comprising:
   a computer-readable data storage medium having program instructions which when executed cause a computer to:
   select a group of connections to merge into a three-dimensional harness object wherein each connection in the group of connections is associated with from-to data specifying a from-connector and a to-connector;
   sort the from-connector and the to-connector into one of a first connector group and a second connector group, for each connection in the group of connections;
   compute a location for a junction where the group of connections emanating from the first connector group merge; and
   route the group of connections from a connector in the first connector group through the junction to a connector in the second connector group.

10. The computer program product of claim 9, wherein program instruction to compute the location for the junction further comprises instructions for causing the computer to:
    determine a geometric center of connectors of the first connector group;
    determine a distance from the geometric center of connectors based on a bend radius of the group of connections;
    determine a direction based on a plurality of direction vectors of the first connector group and a plurality of direction vectors of the second connector group; and
    offset the geometric center of connectors by the distance based on a bend radius in the direction.

11. The computer program product of claim 10, further comprising program instructions for causing the computer to:
    sum a plurality of diameter values to determine a total diameter, where each diameter value is associated with one connection in the group of connections;
    increase the total diameter to account for gaps in a bundle of merged connections;
    multiply the increased total diameter by a factor to determine a minimum bend radius;
    set the bend radius to one of the minimum bend radius and a largest one of a plurality of bend radii associated with each connection in the group of connections.

12. The computer program product of claim 9, further comprising program instructions for causing the computer to:
    determine a plurality of geometric centers for the first connector group and the second connector group by including one of the from-connector and the to-connector in different ones of the first and second connector groups; and sort the from-connector and the to-connector based on a change of the plurality of geometric centers.

13. The computer program product of claim 9, further comprising program instructions for causing the computer to generate a plurality of curves, wherein each curve depicts one connection in the group of connections.

14. The computer program product of claim 9, further comprising program instructions for causing the computer to display the group of connections as a simplified representation of a plurality of connections for a routing system, wherein the simplified representation renders more than one connection having identical from-to connector data as one single connection.

15. The computer program product of claim 14, comprising program instructions for causing the computer to filter the simplified representation based on one of a range of lengths, a wire type, a cable type, a signal name, a signal type, a connector type, a total number of connections, and a zone of the routing system.

16. A computer-aided design system comprising:
a processor operatively coupled to a data storage system, the data storage system storing a model; and
a data storage memory operatively coupled to the processor and comprising instructions to configure the processor to:
specify a plurality of connections forming a routing system, wherein each connection has a first connector and a second connector, and each connection is distinguished by supplemental data;
apply a first filter to the plurality of connections to prevent more than one of the plurality of connections having a same first connector and a same second connector from being rendered more than once by a computer-aided design system;
create a plurality of curves representing the plurality of connections subsequent to the application of the filter such that only one curve is created for any group of the plurality of connections having the same first connector and the same second connector;
display the routing system in a visually simplified manner by rendering the plurality of curves; and
merge a select group of connections into a three-dimensional harness object wherein the select group of connections is depicted as a subset of the plurality of curves.

17. The computer-aided design system of claim 16, wherein to merge a select group of connections further comprises instructions to configure the processor to:
associate from-to data specifying a from-connector and a to-connector with each connection in the select group of connections;
sort the from-connector and the to-connector into one of a first connector group and a second connector group, for each connection in the select group of connections;
determine a location for a junction where the group of connections emanating from the first connector group merge; and
route the select group of connections from a connector in the first connector group through the junction to a connector in the second connector group.

18. The computer-aided design system of claim 17, further comprising instructions to configure the computer to:
determine a plurality of geometric centers for the first connector group and the second connector group by including one of the from-connector and the to-connector in different ones of the first and second connector groups; and
sort the from-connector and the to-connector based on a change of the plurality of geometric centers.

19. The computer-aided design system of claim 16, further comprising instructions to configure the computer to apply a second filter to the plurality of connections for further visual simplification of the routing system.

20. The computer-aided design system of claim 19, wherein the second filter reduces the plurality of curves created based on one of a length of connection, a wire type, a cable type, a signal name, a signal type, a connector type, a total number of connections, and a zone of the routing system.

* * * * *